(12) United States Patent
Park et al.

(10) Patent No.: US 12,397,795 B2
(45) Date of Patent: Aug. 26, 2025

(54) REGENERATIVE BRAKING CONTROL SYSTEM AND METHOD USING PADDLE SHIFT OF HYBRID VEHICLE

(71) Applicants: Hyundai Motor Company, Seoul (KR); Kia Corporation, Seoul (KR)

(72) Inventors: Joon Shik Park, Seoul (KR); Sung Deok Kim, Seongnam-Si (KR); Jin Su Jeong, Suwon-Si (KR); Chang Min Lee, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 204 days.

(21) Appl. No.: 17/845,828

(22) Filed: Jun. 21, 2022

(65) Prior Publication Data

US 2023/0001928 A1 Jan. 5, 2023

(30) Foreign Application Priority Data

Jun. 30, 2021 (KR) .......................... 10-2021-0085214

(51) Int. Cl.
*B60W 30/18* (2012.01)
*B60W 10/08* (2006.01)
*B60W 10/11* (2012.01)

(52) U.S. Cl.
CPC ...... *B60W 30/18127* (2013.01); *B60W 10/08* (2013.01); *B60W 10/11* (2013.01);
(Continued)

(58) Field of Classification Search
CPC ........... B60W 30/18127; B60W 10/08; B60W 10/11; B60W 2540/10; B60W 2540/16; B60W 2552/15; B60W 2710/083; B60W 10/188; B60W 10/10; B60W 10/18; B60W 20/00; B60W 30/18054; B60W 40/076; B60W 40/105; B60W 2520/10; B60T 1/10; B60T 2270/60; B60T 8/24; B60T 8/245; B60T 13/12; B60T 13/66; B60T 2220/02; B60T 13/74; F16D 61/00; Y02T 10/62; B60L 7/10; B60L 15/2009; B60L 2200/00; B60L 2200/10; B60L 2200/18; B60L 2200/32; B60L 2200/36; B60L 2240/48;
(Continued)

(56) References Cited

U.S. PATENT DOCUMENTS 9,248,822 B2 * 2/2016 Hyun .................. B60W 10/192
11,285,928 B2 * 3/2022 Xu .......................... B60T 13/74
(Continued)

*Primary Examiner* — Kurt Philip Liethen
(74) *Attorney, Agent, or Firm* — Morgan Lewis & Bockius LLP

(57) ABSTRACT

A regenerative braking control system and a regenerative braking control method using a paddle shift of a hybrid vehicle, include a paddle switch including a first paddle shift for a down shift and a second paddle shift for an up shift, a first controller electrically connected to the paddle switch and configured to determine a deceleration control amount of regenerative braking for stopping the vehicle as a hold operation of the first paddle shift is input, and a second controller electrically connected to the first controller and configured to control a motor torque for the regenerative braking according to the deceleration control amount determined from the first controller and to control hydraulic braking of the vehicle to be executed when reaching a stop state of the vehicle.

7 Claims, 3 Drawing Sheets

(52) U.S. Cl.
CPC ..... *B60W 2540/10* (2013.01); *B60W 2540/16* (2013.01); *B60W 2552/15* (2020.02); *B60W 2710/083* (2013.01)

(58) Field of Classification Search
CPC .... B60L 2240/486; F16H 59/02; F16H 59/18; F16H 61/0204; B60Y 2200/92
See application file for complete search history.

(56) References Cited

U.S. PATENT DOCUMENTS

| | | | |
|---|---|---|---|
| 2005/0017580 A1* | 1/2005 | Cikanek | B60W 20/00 303/191 |
| 2007/0241611 A1* | 10/2007 | Shimada | B60K 6/44 303/155 |
| 2014/0180518 A1* | 6/2014 | Hayashi | B60K 6/52 701/22 |
| 2015/0006039 A1* | 1/2015 | Hyun | B60W 30/18127 701/48 |
| 2017/0282898 A1* | 10/2017 | Shimizu | B60L 50/16 |
| 2017/0282926 A1* | 10/2017 | Hashizaka | B60W 30/18127 |
| 2019/0176827 A1* | 6/2019 | Han | B60W 30/18072 |
| 2019/0202296 A1* | 7/2019 | Han | B60L 7/18 |
| 2019/0366993 A1* | 12/2019 | Park | B60W 30/025 |
| 2020/0148208 A1* | 5/2020 | Choi | B60W 30/18127 |
| 2020/0180631 A1* | 6/2020 | Na | B60W 10/06 |

* cited by examiner

REGENERATIVE BRAKING CONTROL SYSTEM AND METHOD USING PADDLE SHIFT OF HYBRID VEHICLE

CROSS-REFERENCE TO RELATED APPLICATION

The present application claims priority to Korean Patent Application No. 10-2021-0085214 filed on Jun. 30, 2021, the entire contents of which is incorporated herein for all purposes by this reference.

BACKGROUND OF THE INVENTION

Field of the Invention

The present invention relates to a regenerative braking control system and a regenerative braking control method using a paddle shift of a hybrid vehicle, and more particularly, to a regenerative braking control system and a regenerative braking control method using a paddle shift of a hybrid vehicle, which perform a vehicle stop through regenerative braking using a paddle shift and allow hydraulic braking to be performed in a full vehicle stop state so that a micro behavior is capable of being suppressed when stopping to improve driving ability.

Description of Related Art

Generally, by use of motors, eco-friendly vehicles such as hybrid vehicles and pure electric vehicles are driven and batteries are charged so that it is possible to obtain effects such as improvement in fuel efficiency and reduction in exhaust gas.

To the present end, a driving mode of the eco-friendly vehicle includes an EV mode in which the eco-friendly vehicle is traveling with only power of a motor, an HEV driving mode capable of obtaining an effect of reducing fuel efficiency when compared to acceleration using only an engine through power distribution between the engine and the motor, and a regenerative braking mode in which, when the vehicle is braking or traveling due to inertia, vehicle braking energy and inertia energy are recovered from the motor through power generation to charge a battery.

As an example of controlling the regenerative braking mode applied to an electric vehicle, a motor torque (a wheel torque) is controlled according to a vehicle speed for each traveling situation so that a total of four or more regenerative braking steps may be automatically performed.

In the instant case, different deceleration control is performed for each of the four or more regenerative braking stages, and to allow a user to feel a sense of distinction between the four or more regenerative braking stages, an interval between the four or more regenerative braking stages is generally set to be constant.

Meanwhile, to travel with multiple gears like a manual vehicle, even the electric vehicle (an automatic transmission vehicle) is provided with a first paddle shift for a down shift and a second paddle shift for an up shift which are mounted on both side portions of a steering wheel. These paddle shifts provide a convenient advantage of rapidly performing a gear shifting without taking his or her hands off from the steering wheel.

Furthermore, a driver can directly adjust a regenerative braking mode using a paddle shift. For example, when a left pedal shift, i.e., a paddle shift for a down shift, is held, regenerative braking which decelerates at the greatest deceleration until a vehicle stops is performed. This is referred to as a one-pedal mode using a paddle shift.

For reference, the one-pedal mode is a mode capable of operating from vehicle traveling to a deceleration stop using only one accelerator pedal without operating a brake pedal. Without a brake pedal operation, regenerative braking according to the deceleration stop may be performed. This method using the paddle shift is one of methods of implementing the one-pedal mode.

However, during actual traveling, when the regenerative braking mode applied to the electric vehicle is divided and performed in four or more regenerative braking stages, the driver feels a sense of distinction on different deceleration in each regenerative braking stage as a different feeling, and this is actually being raised as one of field claims.

When the regenerative braking phase is continuously changed or when the one-pedal mode is executed to achieve a complete stop, the driver feels the most different feeling. This is because it is difficult to respond in real time to a situation in which a feeling of slightly moving back and forth according a road surface condition occurs immediately after the vehicle stops.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a regenerative braking control system and a regenerative braking control method using a paddle shift of a hybrid vehicle, wherein a state in which a "−" paddle shift is pressed may be maintained for a predetermined time period so that a step of executing the regenerative braking for a stop may be performed, and in the instant case, when the vehicle speed reaches the stop state and is maintained for a predetermined time period, the hydraulic braking may be executed to assist a vehicle stop maintaining function, reducing heat generation of a motor and reducing energy.

Objectives of the present invention are not limited to the above-described objectives, and other objectives of the present invention, which are not mentioned, may be understood by the following description and also will be apparently understood through embodiments of the present invention. Furthermore, the objectives of the present invention may be implemented by means described in the appended claims and a combination thereof.

In various exemplary embodiments of the present invention, various aspects of the present invention provide a regenerative braking control system using a paddle shift of a hybrid vehicle, the regenerative braking control system including a paddle switch including a first paddle shift for down shifting and a second paddle shift for up shifting, a first controller electrically connected to the paddle switch and configured to determine a deceleration control amount of regenerative braking for stopping the vehicle as a hold operation of the first paddle shift is input, and a second controller electrically connected to the first controller and configured to control a motor torque for the regenerative braking according to the deceleration control amount determined from the first controller and to control hydraulic braking of the vehicle to be executed when reaching a stop state of the vehicle.

Here, the second controller may selectively control an amount of the hydraulic braking according to inclination conditions of the vehicle when the hydraulic braking has been executed.

Furthermore, the second controller may be configured to control the hydraulic braking to be selectively released depending on whether an accelerator position sensor (APS) is executed in response to an accelerator pedal operation when the vehicle has been stopped by the execution of the hydraulic braking.

In another exemplary embodiment of the present invention, various aspects of the present invention provide a regenerative braking control method using a paddle shift of a hybrid vehicle, the regenerative braking control method including determining, by a first controller, whether a hold operation of a first paddle shift has been performed in response to an input of an operation of the first paddle shift for a down shift in a regenerative braking condition of the vehicle; performing, by a second controller electrically connected to the first controller, regenerative braking when the second controller determines that the hold operation of the first paddle shift is performed for a predetermined time period in the determining of whether a hold operation of a first paddle shift has been performed, achieving a stop state of the vehicle; and executing, by the second controller, the hydraulic braking when the second controller determines that the stop state of the vehicle has been maintained with the holding operation of the first paddle shift in the performing of regenerative braking.

Here, in the executing of the hydraulic braking, an amount of the hydraulic braking may be selectively controlled according to an inclination condition of the vehicle in a state in which the hydraulic braking is executed.

Furthermore, in the executing of the hydraulic braking, when an operation of the first paddle shift is input, among a plurality of preset deceleration steps according to deceleration due to control, an initial first step may be performed on the regenerative braking, and when the hold operation of the first paddle shift is performed, the control is changed to a final step for stopping the vehicle.

Furthermore, in the determining of whether a hold operation of a first paddle shift has been performed, when the hold operation of the first paddle shift is released and the operation of the first paddle shift is released, a deceleration step may be controlled upward to apply a regenerative braking torque which is greater than a regenerative braking torque before the first paddle shift is released.

Meanwhile, the regenerative braking control method using a paddle shift of a hybrid vehicle may further include determining whether an APS is executed according to an accelerator pedal operation with respect to the vehicle in the stop state due to the execution of the hydraulic braking; and in the APS execution determination operation, a hydraulic braking release operation, of selectively releasing the hydraulic braking in response to an input of an APS detection signal and performing an acceleration traveling in response to the input of the APS detection signal.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the present invention are discussed infra.

Figure 1:
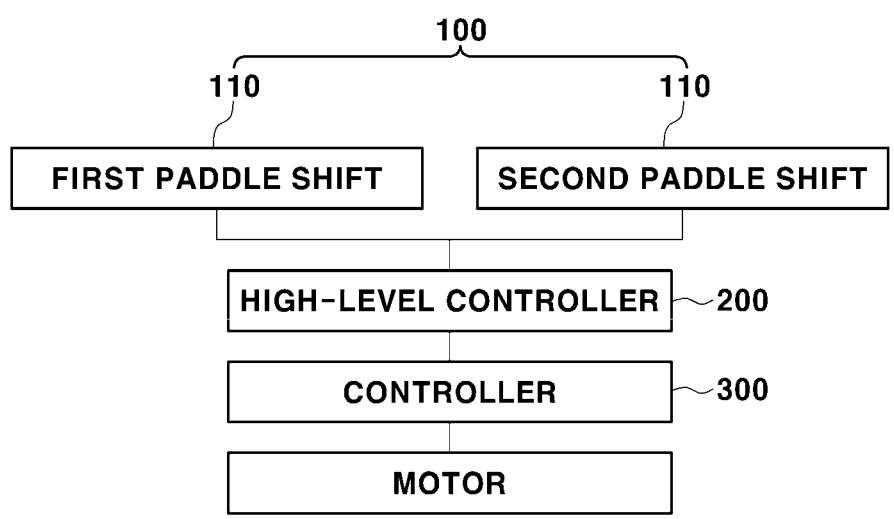
FIG. 1 is a diagram illustrating a configuration of a regenerative braking control system using a paddle shift of a hybrid vehicle according to various exemplary embodiments of the present invention.

It should be understood that the appended drawings are not necessarily to scale, presenting a somewhat simplified representation of various preferred features illustrative of the basic principles of the present invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but further various alternatives, modifications, equivalents and other embodiments, which may be included within the spirit and scope of the present invention as defined by the appended claims.

Hereinafter, various exemplary embodiments according to various exemplary embodiments of the present invention will be described in detail with reference to the accompanying drawings.

The advantages and features of the present invention and the manner of achieving the advantages and features will become apparent with reference to the exemplary embodiments described in detail below with the accompanying drawings.

The present invention may, however, be implemented in various forms and should not be construed as being limited to the exemplary embodiments set forth herein, and the exemplary embodiments are provided such that the present disclosure will be thorough and complete and will fully convey the scope of the present invention to those skilled in the art to which various exemplary embodiments of the present invention pertains, and the present invention is defined by only the scope of the appended claims.

Furthermore, in the following description of the present invention, when a detailed description of a known related art is determined to unnecessarily obscure the gist of the present invention, the detailed description thereof will be omitted herein.

Figure 2:
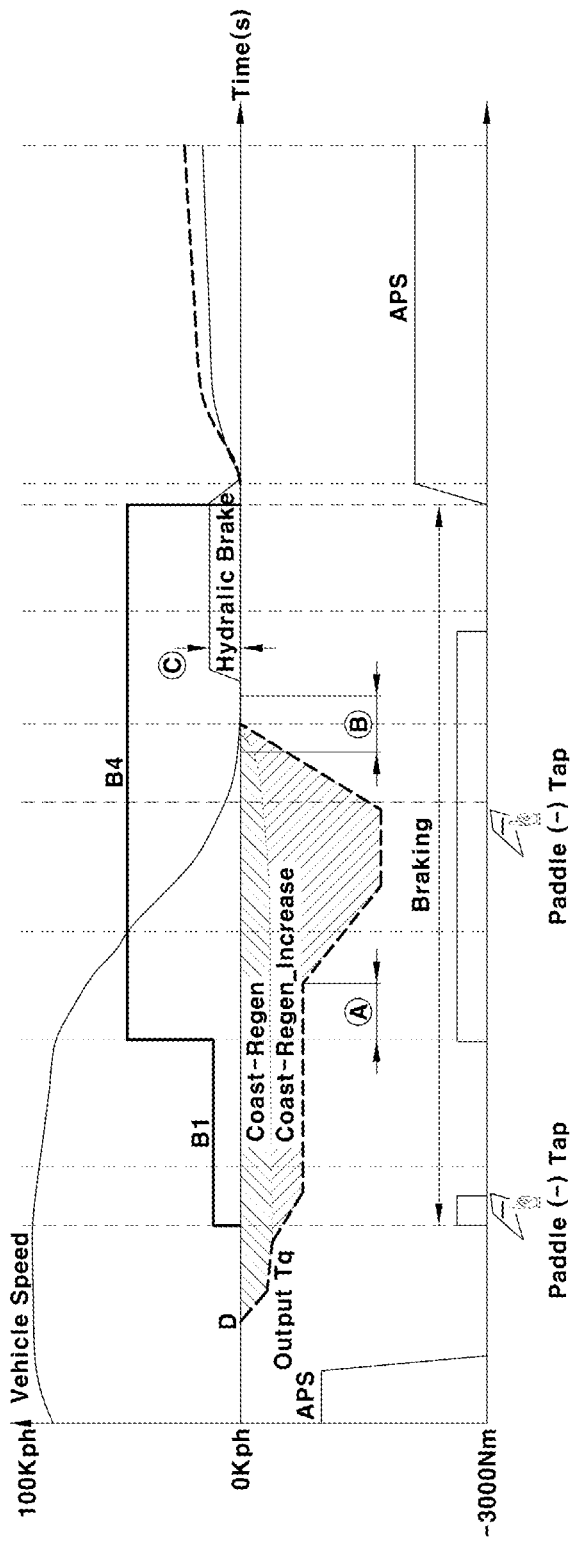
FIG. 2 is a diagram illustrating execution of hydraulic braking in the regenerative braking control system using a paddle shift of a hybrid vehicle according to various exemplary embodiments of the present invention.

FIG. 1 is a diagram illustrating a configuration of a regenerative braking control system using a paddle shift of a hybrid vehicle according to various exemplary embodiments of the present invention, and FIG. 2 is a diagram illustrating execution of hydraulic braking in the regenerative braking control system using a paddle shift of a hybrid vehicle according to various exemplary embodiments of the present invention.

As shown in FIG. 1, the regenerative braking control system using a paddle shift of a hybrid vehicle according to the exemplary embodiment includes a paddle switch 100, a high-level controller 200, and a controller 300.

The paddle switch 100 includes a first paddle shift 110 for a down shift and a second paddle shift 120 for an up shift which are mounted on both side portions of a steering wheel.

Generally, in a vehicle, a driver may operate to select a park (P) stage, a reverse (R) stage, a neutral (N) stage, a drive (D) stage, a short rise (+) stage, a slow lower (−) stage through a shift lever. An indication of the operated automatic gear shifting stage is made through a gear shifting stage display device.

Furthermore, according to the vehicle, as a gear shifting operation portion for a manual mode operation of an automatic transmission, the paddle switch 100 configured for operating + and − (up/down), that is, the first paddle shift 110 corresponding to "−" and the second paddle shift 120 corresponding to "+," may be provided in the steering wheel.

Consequently, when the second paddle shift 120 of the first paddle shift 110 and the second paddle shift 120 which form the paddle switch 100 is operated, a gear shifting stage is increased due to a control signal according to the operation (for example, in the case of a six-stage transmission, D1→D2, D2→D3, D3→D4, D4→D5, and D5→D6), and when the first paddle shift 110 is operated, the gear shifting stage is decreased due to a corresponding control signal (for example, in the case of the six-stage transmission, D6→D5, D5→D4, D4→D3, D3→D2, and D2→D1).

In various exemplary embodiments of the present invention, the paddle switch 100 is used to allow variable control of the regenerative braking amount according to the number of gear shifting stages to be performed, and thus deceleration of the motor is controlled through signals ("+" and "−" signals) of the paddle switch 100, which are shift intent signals of the driver in the high-level controller 200, and signals ("+" and "−" signals) of the paddle switch 100 is used as an input signal for the variable control of the regenerative braking amount.

Here, when the "−" signal is input, the high-level controller 200 determines a deceleration control amount of the regenerative braking for stopping according to a torque map which is stored in advance and corresponds to the input signal, so that when the deceleration control amount is determined due to the signal according to a "+" or "−" operation of the paddle switch 100, the deceleration is performed according to a corresponding deceleration step.

Meanwhile, the controller 300 controls a motor torque for the regenerative braking according to the deceleration control amount determined from the high-level controller 200, and as a current state reaches a stop state in a state in which the deceleration is performed, the controller 300 controls to execute hydraulic braking.

That is, as shown in FIG. 2, when the driver presses the first paddle shift 110 while the vehicle is traveling in the D stage, the deceleration is performed by as much as the deceleration control amount according to a corresponding torque map, that is, a set deceleration step B1.

Here, as a hold operation input of the first paddle shift 110 is input from the high-level controller 200, as described above, in a state in which the first paddle shift 110 is pressed and thus the deceleration is performed to the corresponding deceleration control amount due to the deceleration step B1, the controller 300 detects a state in which the press of the first paddle shift 110 is maintained for a predetermined time period (for a time A of FIG. 2) to change the deceleration step B1 to a final step B4.

As described above, in the state of being changed to the final step B4, it is determined that the vehicle reaches a stop, within 0 to 3 kph, and the stop state is maintained for a predetermined time period (for a time B of FIG. 2), the controller 300 controls the motor torque for regenerative braking to be decreased and controls the hydraulic braking to be executed as a compensation for the decrease in motor torque.

As described above, when the stop state of the vehicle is maintained due to the execution of the hydraulic braking, since the use of the motor torque for the regenerative braking may be reduced when compared with before the execution of the hydraulic braking, heat generation in the motor may be prevented through reduction of the use of the motor and reduction of energy to be used in electric power generation may further be possible.

Meanwhile, since the vehicle in the state in which the hydraulic braking is executed corresponds to an inclination condition, the controller 300 may selectively adjust an amount (magnitude) of which the hydraulic braking is executed (a height C of FIG. 2).

For example, when it is determined that the vehicle stops in an ascending condition (an uphill condition) as a result of determining whether the presence or absence of an inclination is detected through a gyro sensor or the like in the state in which the vehicle stops, the controller 300 controls a braking torque which is relatively greater than a braking torque in a flat inclination condition to be applied to allow the hydraulic braking to be executed at a level at which the vehicle is not pushed in the ascending condition.

Here, the magnitude of the hydraulic braking may be determined through an equation of (A (constant)+m*g*sinB (inclination angle))*C (coefficient). In the instant state, when the execution of the hydraulic braking having the above magnitude is confirmed, the controller 300 controls the motor torque for the regenerative braking to be decelerated.

This is because, even when the hydraulic braking torque is applied to prevent a push in the inclination condition such as the ascending or descending, the motor torque for the regenerative braking is controlled to be remained in a reduced state so that, even when the application of the hydraulic braking torque is released in the worst case, the push may be prevented through the motor torque maintained in a state of being applied.

Consequently, according to the related art, a variance of a vehicle speed is determined in consideration of the ascending or descending condition, and the motor torque for the regenerative braking is generated through feedback control according to the variance. However, in the instant case, immediately after the vehicle stops through the motor torque, a feeling that the vehicle moves slightly forwards and backwards may occur according to the ascending or descending condition. In various exemplary embodiments of the present invention, the hydraulic braking is executed in the state in which the vehicle stops so that the above problem according to the related art may be solved.

Meanwhile, the controller 300 determines whether to execute an accelerator position sensor (APS) according to an accelerator pedal operation, that is, controls the hydraulic braking to be selectively released through a turning on or off with respect to the vehicle in the stop state due to the execution of the hydraulic braking.

In other words, when the controller 300 executes the hydraulic braking in the state in which the vehicle stops, even when the press on the first paddle shift 110 is released, the vehicle does not move. Here, the controller 300 controls the hydraulic braking to be released only when an ON signal according to the accelerator pedal operation is transmitted, except for the paddle switch 100.

Figure 3:
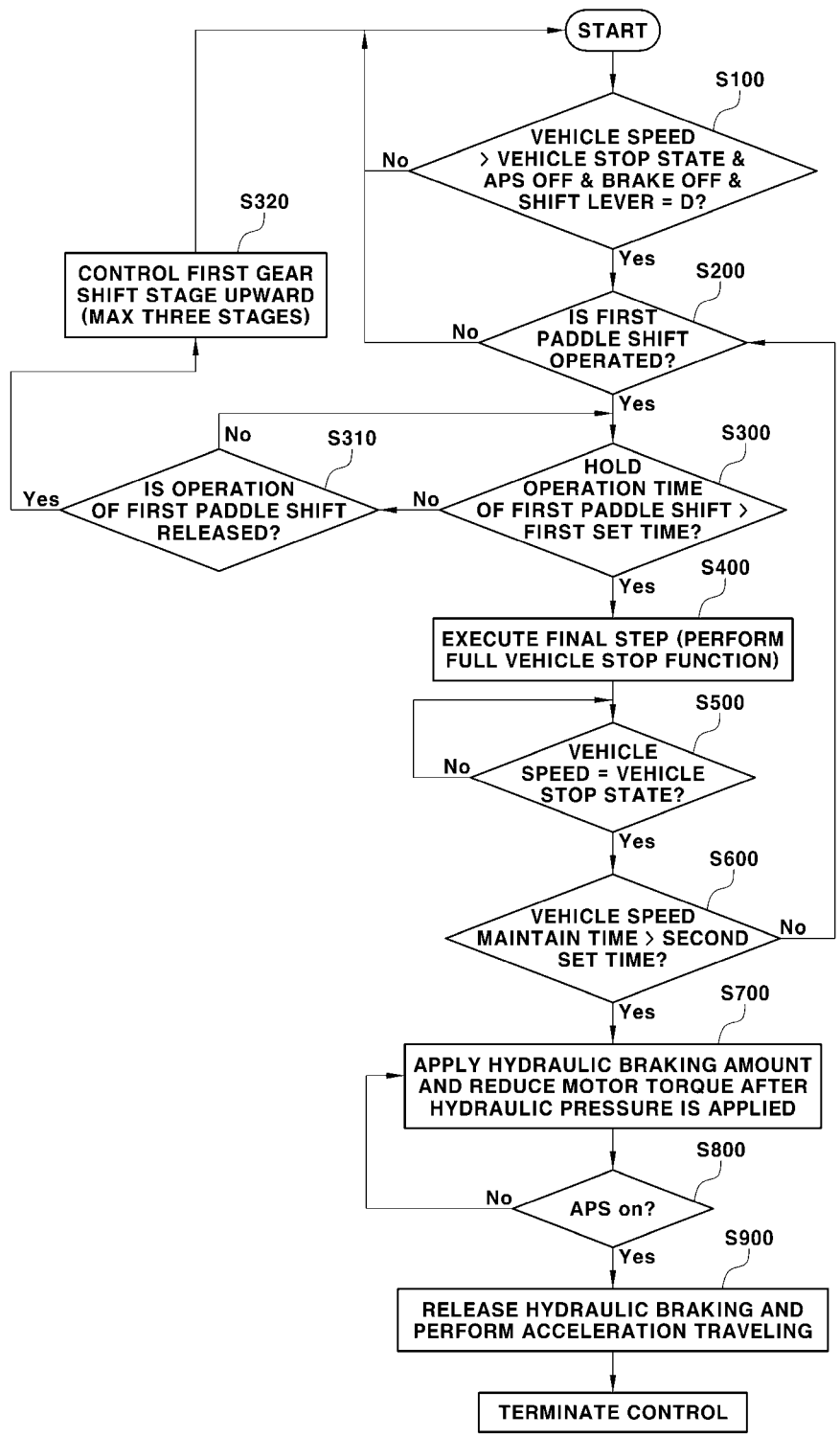
FIG. 3 is a diagram illustrating a regenerative braking control method using a paddle shift of a hybrid vehicle according to various exemplary embodiments of the present invention.

Hereinafter, FIG. 3 is a diagram illustrating a regenerative braking control method using a paddle shift of a hybrid vehicle according to various exemplary embodiments of the present invention.

As shown in FIG. 3, the regenerative braking control method using a paddle shift of a vehicle according to the exemplary embodiment will be sequentially referred to as follows.

First, in a state in which a shift lever is in a D stage, the application of the motor torque for the regenerative braking is executed due to a turning off the accelerator pedal operation, when it is determined that the vehicle speed ranges 0 to 3 kph or more, the accelerator pedal and the brake pedal are in a state of being not operated, and the shift lever corresponds to a D stage (S100), it is determined whether an operation of the first paddle shift 110 for a down shift is input from the high-level controller 200 (S200).

In the instant case, when the operation of the first paddle shift 110 is input and the corresponding operation is maintained, that is, an operation state with respect to the first paddle shift 110 is maintained for a first set time and determination on a hold operation is performed (S300), regenerative braking for reaching a stop state of the vehicle is performed by the controller 300.

When the operation of the first paddle shift 110 is input (S200), the controller 300 performs an initial first step B1 among predetermined deceleration steps (see B1 to B4 of FIG. 2) first according to the deceleration due to the regenerative braking control. Afterward, when a press time for the first paddle shift 110 is maintained for the first set time, the controller 300 controls to change to the final step B4 for stopping (S400).

Here, in the case of the first step B1 to the fourth step, that is, the final step B4, different motor torques are mapped and stored as a torque map, and the stop of the vehicle may be performed in only the state of being changed to the final step B4. Accordingly, through the determination whether the press time for the first paddle shift 110 is maintained for the first set time, that is, the change to the final step B4, determination on the vehicle stop is selectively performed.

In the instant case, when it is determined that the operation state for the first paddle shift 110 is not maintained for a predetermined time period (S300), whether the first paddle shift 110 is pressed is determined (S310). When it is determined that the press for the first paddle shift 110 is released, since the accelerator pedal and the brake pedal are in a state of being not operated, the first step B1 is increased to a second step to generate a regenerative braking torque which is greater than a regenerative braking torque of the first step B1 (S320).

Furthermore, when it is determined that the first paddle shift 110 is in a state of being pressed as a result of determining whether the first paddle shift 110 is pressed (S310), whether the hold operation for the first paddle shift 110 is performed is determined again.

On the other hand, when it is determined that the controller 300 performs control using the motor torque for the regenerative braking corresponding to a final step B4 (S400), and when the vehicle speed is in the vehicle stop state, for example, corresponds within 0 to 3 kph (S500), whether the vehicle speed is maintained in the corresponding stop state for a second set time is determined (S600).

When it is determined that the vehicle stop state is maintained for the second set time (S600), the controller 300 controls the hydraulic braking to be executed (S700). When it is determined that the vehicle stop state is maintained to be less than the second set time (S600), a standby is performed to maintain the vehicle stop state again for more than the second set time.

This is to prevent a different feeling because, when the vehicle stop state is determined and the hydraulic braking is immediately executed without the passage of the second set time period (S700), the regenerative braking and the hydraulic braking may act together, and thus the different feeling may occur.

Furthermore, as described above, when the stop state of the vehicle is maintained due to the execution of the hydraulic braking, since the use of the motor torque for the regenerative braking may be reduced when compared with before the execution of the hydraulic braking, heat generation in the motor may be prevented through reduction of the use of the motor and reduction of energy to be used in electric power generation may further be possible.

Furthermore, as described above, in controlling the hydraulic braking to be executed by the controller 300 (S700), as the condition of the stop vehicle corresponds to the inclination condition, the controller 300 may selectively adjust an amount (magnitude) of which the hydraulic braking is executed (the height C of FIG. 2).

For example, when it is determined that the vehicle stops in an ascending condition (an uphill condition) as a result of determining whether the presence or absence of an inclination is detected through a gyro sensor or the like in the state in which the vehicle stops, the controller 300 controls a braking torque which is relatively greater than a braking torque in a flat inclination condition to be applied to allow the hydraulic braking to be executed at a level at which the vehicle is not pushed in the ascending condition.

As described above, when the stop state of the vehicle is maintained due to the execution of the hydraulic braking, since the use of the motor torque for the regenerative braking may be reduced when compared with before the execution of the hydraulic braking, heat generation in the motor may be prevented through reduction of the use of the motor and reduction of energy to be used in electric power generation may further be possible.

Thereafter, the controller 300 determines whether to execute the APS according to an accelerator pedal operation, that is, controls the hydraulic braking to be selectively released through a turning on or off with respect to the vehicle in the stop state due to the execution of the hydraulic braking (S800).

In other words, when the controller 300 executes the hydraulic braking in the state in which the vehicle stops, even when the press on the first paddle shift 110 is released, the vehicle does not move. Here, the controller 300 controls the hydraulic braking to be released and performs an acceleration traveling only when an ON signal according to the accelerator pedal operation is transmitted, except for the paddle switch 100 (S900).

In the instant case, when an off state of the APS is maintained (S800), the stop state of the vehicle is continuously maintained, that is, the state of executing the hydraulic braking for the vehicle in the stop state is maintained (S700).

In various exemplary embodiments of the present invention, a state in which the "−" paddle shift is pressed is maintained for a predetermined time period so that a step of the regenerative braking for a stop is executed. In the instant case, when the vehicle speed reaches the stop state and is maintained for a predetermined time period, the hydraulic braking is executed to assist a vehicle stop maintaining function. Thus, when the vehicle stops, a micro movement of the vehicle is configured for being prevented using the hydraulic braking so that there is an effect configured for reducing the motor torque for the regenerative braking.

Accordingly, in various exemplary embodiments of the present invention, when the hydraulic braking is applied, the reduction in the motor torque is performed so that there is an effect configured for preventing generation of a problem such as heat generation in the motor in advance.

Furthermore, in various exemplary embodiments of the present invention, when the hydraulic braking is applied, different hydraulic braking control amounts may be set according to the inclination condition in which the vehicle is located, that is, the ascending/descending situations so that, even in the inclination condition, the reduction in motor torque may be possible after the application of the hydraulic pressure, and thus there is an effect of reducing the heat generation in the motor and reducing energy.

In accordance with various aspects of the present invention, a state in which the "−" paddle shift is pressed may be maintained for a predetermined time period so that a step of the regenerative braking for a stop may be executed. In the instant case, when the vehicle speed reaches the stop state and is maintained for a predetermined time period, the hydraulic braking may be executed to assist a vehicle stop maintaining function. Thus, when the vehicle stops, a micro movement of the vehicle may be prevented using the hydraulic braking so that there is an effect configured for reducing the motor torque for the regenerative braking.

Accordingly, in accordance with various aspects of the present invention, when the hydraulic braking is applied, the reduction in the motor torque may be performed so that there is an effect configured for preventing generation of a problem such as heat generation in the motor in advance.

Furthermore in accordance, in accordance with various aspects of the present invention, when the hydraulic braking is applied, different hydraulic braking control amounts may be set according to the inclination condition in which the vehicle is located, that is, the ascending/descending situations so that, even in the inclination condition, the reduction in motor torque may be achieved after the application of the hydraulic pressure, and thus there is an effect of reducing the heat generation in the motor and reducing energy.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can further be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A regenerative braking control system using a paddle shift of a vehicle, the regenerative braking control system comprising:
    a paddle switch including a first paddle shift for down shifting and a second paddle shift for up shifting;
    a first controller electrically connected to the paddle switch and configured to determine a deceleration control amount of regenerative braking for stopping the vehicle as a hold operation of the first paddle shift is input; and
    a second controller electrically connected to the first controller and configured to control a motor torque for the regenerative braking according to the deceleration control amount determined from the first controller and to control hydraulic braking of the vehicle to be executed when the second controller determines that a stop state of the vehicle has been maintained for a predetermined time period in a state in which a press of the first paddle shift is maintained for a predetermined time period,
    wherein the second controller is further configured to selectively control an amount of the hydraulic braking according to inclination conditions of the vehicle when the hydraulic braking has been executed, yet to control the motor torque for regenerative braking to be remained in a reduced state,
    wherein the second controller is further configured to control in the executing of the hydraulic braking, when an operation of the first paddle shift is input, among a plurality of preset deceleration steps according to deceleration due to control, an initial first step is performed on the regenerative braking, and when the hold operation of the first paddle shift is performed, the control is changed to a final step for stopping the vehicle, and
    wherein, in determining of whether the hold operation of the first paddle shift has been performed, when the hold operation of the first paddle shift is released and the operation of the first paddle shift is released, a deceleration step is controlled upward to apply a regenerative braking torque which is greater than a regenerative braking torque before the first paddle shift is released.

2. The regenerative braking control system of claim 1, wherein the second controller is further configured to control the hydraulic braking to be selectively released depending on whether an accelerator pedal operation detected from an accelerator position sensor (APS) is executed in response to an accelerator pedal operation when the vehicle has been stopped by the execution of the hydraulic braking.

3. The regenerative braking control system of claim 2, wherein the second controller is further configured to perform an acceleration traveling in response to an input of an APS detection signal.

4. A regenerative braking control method using a paddle shift of a vehicle, the regenerative braking control method comprising:
    determining, by a first controller, whether a hold operation of a first paddle shift has been performed in response to an input of an operation of the first paddle shift for a down shift in a regenerative braking condition of the vehicle;
    performing, by a second controller electrically connected to the first controller, regenerative braking when the second controller determines that the hold operation of the first paddle shift is performed for a predetermined time period in the determining of whether the hold operation of the first paddle shift has been performed, achieving a stop state of the vehicle; and
    executing, by the second controller, hydraulic braking when the second controller determines that the stop state of the vehicle has been maintained for a predetermined time period in a state in which a press of the first paddle shift is maintained for a predetermined time period,
    wherein, in the executing of the hydraulic braking, an amount of the hydraulic braking is selectively controlled according to an inclination condition of the vehicle in a state in which the hydraulic braking is executed, yet to control the motor torque for regenerative braking to be remained in a reduced state,
    wherein, in the executing of the hydraulic braking, when an operation of the first paddle shift is input, among a plurality of preset deceleration steps according to deceleration due to control by the second controller, an initial first step is performed on the regenerative braking, and when the hold operation of the first paddle shift is performed, the control is changed to a final step for stopping the vehicle, and
    wherein, in the determining of whether the hold operation of the first paddle shift has been performed, when the hold operation of the first paddle shift is released and the operation of the first paddle shift is released, a deceleration step is controlled upward to apply a regenerative braking torque which is greater than a regenerative braking torque before the first paddle shift is released.

5. The regenerative braking control method of claim 4, further including:
    determining, by the second controller, whether an accelerator pedal operation detected from an APS is executed with respect to the vehicle in the stop state due to the execution of the hydraulic braking.

6. The regenerative braking control method of claim 5, further including:
    selectively releasing, by the second controller, the hydraulic braking in response to an input of an APS detection signal and performing an acceleration traveling in response to the input of the APS detection signal.

7. A non-transitory computer readable storage medium on which a program for performing the regenerative braking control method of claim 4 is recorded.

* * * * *